Oct. 12, 1954
D. R. BALLARD
2,691,360
ADJUSTABLE SUPPLY POULTRY FEEDER
Filed June 2, 1950
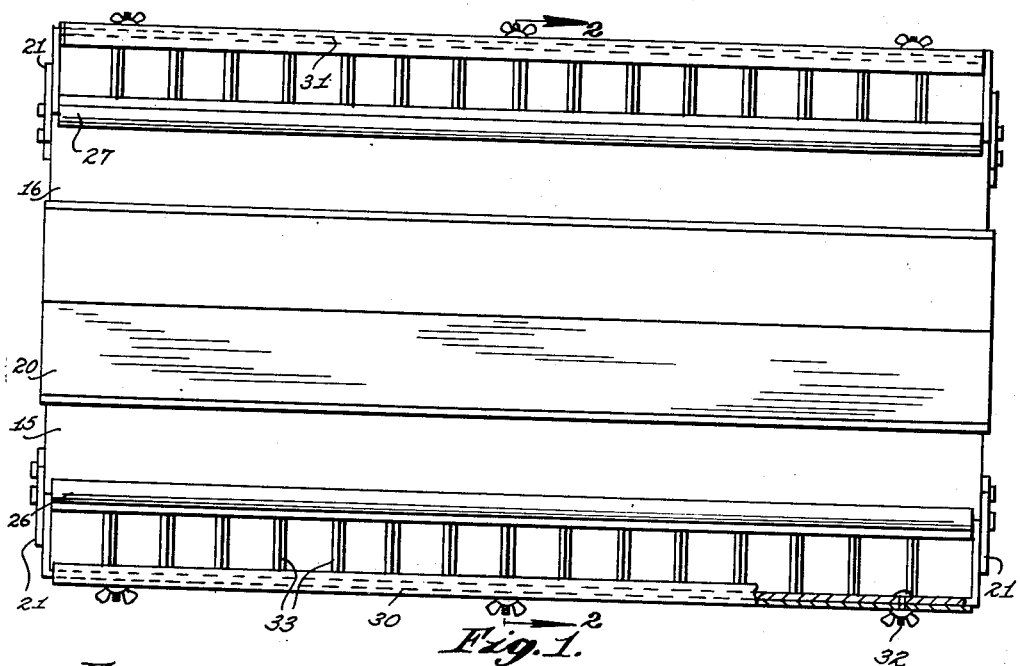
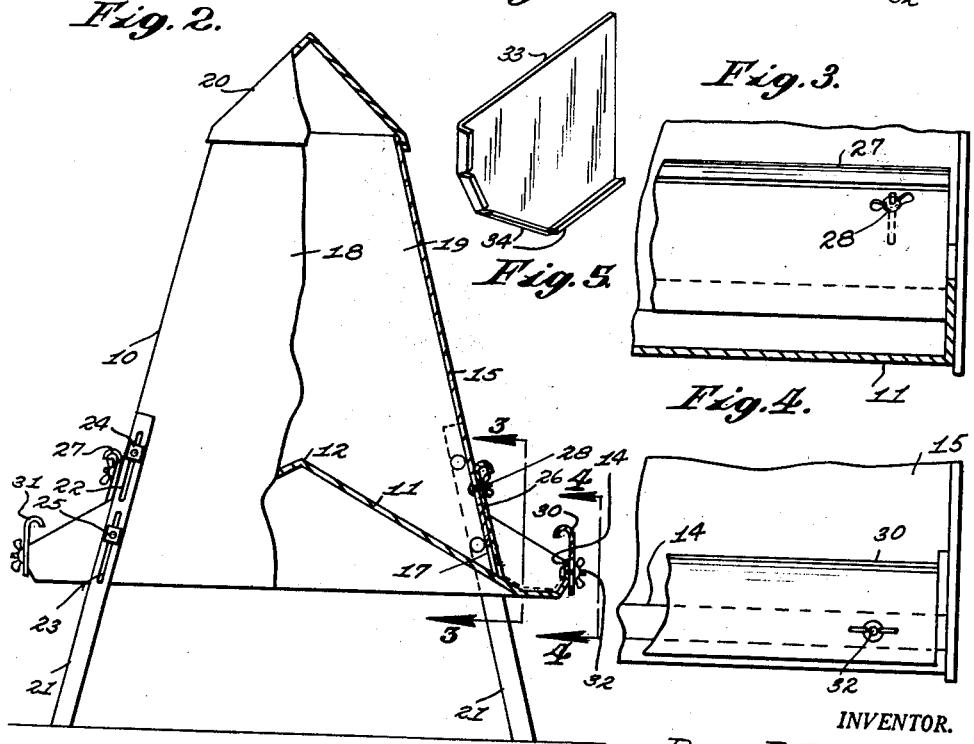
INVENTOR.
DANA R. BALLARD
BY
McMorrow, Berman + Davidson
ATTORNEYS Patented Oct. 12, 1954

2,691,360

UNITED STATES PATENT OFFICE 2,691,360

ADJUSTABLE SUPPLY POULTRY FEEDER

Dana R. Ballard, Madera, Calif.

Application June 2, 1950, Serial No. 165,701

2 Claims. (Cl. 119—53)

This invention relates to poultry feed dispensers and more particularly to a dispenser that is adjustable for different sizes of poultry and to regulate the rate at which the feed is dispensed.

It is among the objects of the invention to provide an improved feed dispenser which is supported on legs above the ground or floor to protect the feed from moisture and from rats and mice but is adjustable in height to accommodate the feeder to poultry of different sizes from small chicks to full grown turkeys, which includes adjustable means for regulating the rate at which feed is dispensed, which includes narrow feed troughs traversed at frequent intervals by partitions so that the birds cannot scratch or scatter the feed from the troughs and cannot get into troughs to waste and foul the feed, which includes adjustable means for raising the sides of the troughs in accordance with the height and size of the birds to be fed, which holds a large quantity of feed to render frequent refilling unnecessary and effectively protects the feed against moisture, insects and rodents, which is easy to fill and adjust, and which is strong and durable in construction yet light in weight, economical to manufacture, and neat and attractive in appearance.

Other objects and advantages will become apparent from a consideration of the following description and the appended claims in conjunction with the accompanying drawing wherein:

Figure 1 is a top plan view of a poultry feed dispenser illustrative of the invention, a portion being broken away and shown in cross section to better illustrate the construction thereof;

Figure 2 is a transverse cross sectional view on the line 2—2 of Figure 1;

Figure 3 is a fragmentary cross sectional view of the line 3—3 of Figure 2;

Figure 4 is a fragmentary elevational view showing a structural detail of the device; and Figure 5 is an enlarged perspective view of a partition plate constituting a component of the device.

With continued reference to the drawing the feeder comprises an elongated hollow housing 10 having a bottom wall 11 which is rectangular in plan and slopes downwardly and outwardly in opposite directions from an apex 12 extending along its longitudinal center line.

The bottom wall includes horizontal outer portions 13 which extend laterally outwardly beyond the housing side walls, and the portions 13 terminate at their laterally outward edges in longitudinal upstanding flanges 14. The portions 13 constitute the bottoms of feed troughs extending one along each longitudinal edge of the bottom wall and the flanges 14 constitute the outer walls of these troughs.

The housing side walls 15 and 16 extend upwardly and inwardly from locations adjacent to the inward edges of the trough bottoms 13 and of the bottom wall spaced from the flanges 14 a distance somewhat greater than the width of the trough bottoms 13. These side walls have their lower edges 15' spaced upwardly from the bottom wall to provide between the bottom wall and the lower edge of each side wall a feed slot 17. The side walls 15 and 16 converge symmetrically upwardly from the bottom wall and two end walls 18 and 19 are disposed one at each end of the housing 10. The two end walls are preferably substantially parallel to each other and each is joined to the corresponding ends of the bottom and side walls of the housing.

A ridged cover 20 of triangular cross sectional shape fits on the open upper end of the housing 10 with its peak directed upwardly so that the birds to be fed from the dispenser cannot roost comfortably on the top of the cover.

Four legs 21 are disposed one at each corner of the housing 10 and are arranged in pairs with the two legs of each pair disposed at respectively opposite sides of the same end wall. The legs are elongated flat bars provided with longitudinally extending slots 22 and 23 and bolts 24 and 25 extend through apertures in the end walls and through the slot in the legs to adjustably secure the legs to the end walls of the body 10. With this arrangement the distance which the legs project below the bottom wall 11 can be varied to change the height of the troughs above the ground or floor on which the dispenser is supported.

A plate 26 extends longitudinally along the outer side of the side wall 15 at the lower edge of the latter and a similar plate 27 extends longitudinally along the outer side of the side wall 16 at the lower edge of this side wall. These plates are of elongated rectangular shape and are provided with transversely extending slots and suitable bolts 28 extend through these slots and through apertures in the side walls 15 and 16 to adjustably secure the plates to the side walls. The plates 26 and 27 can be adjustably raised and lowered to vary the width of the feed slots 17 and thereby regulate the rate at which the feed is dispensed from the device.

An elongated plate 30 is adjustably secured to the outer side of one of the longitudinal flanges 14 of the bottom wall and a similar plate 31 is secured to the outer side of the opposite flange. These plates are also provided with transversely extended slots, and bolts 32 extend through these slots and through apertures in the bottom wall flanges to adjustably secure the plates 30 and 31 to the flanges. These plates 30 and 31 can be adjusted up and down to vary the depth of the feed troughs to accommodate the troughs to different sizes of poultry.

The plates 26, 27 and 30, 31 all have their upper edges turned over to serve as finger grips for raising and lowering them, and the turned over edges of the plates 30 and 31 serve both as finger grips and as guards which protect the poultry from the sharp edges which otherwise would be present along the tops of the plates 30 and 31.

A series of partitions or baffles 33 is disposed in each of the feed troughs and these baffles extend transversely of the troughs at locations spaced apart along the troughs at distances such that the birds cannot get into the troughs between the baffles. Each of the baffles 33, as particularly illustrated in Figure 5, comprises a plate portion having a shape in plan substantially the same as the shape of the cross sectional area of the feed trough and having flanges 34 along its edges which engage the bottom and sides of the trough in which it is mounted which flanges are welded or otherwise rigidly secured to the trough.

The feed dispenser may be made in various sizes if desired and, with only immaterial modifications, can be adapted for the feeding of stock other than poultry. Also, feed dispensing devices of the same cross sectional shape and area may be provided in different lengths to accommodate different quantities of poultry, as may be desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a poultry feeder, a housing having a side wall and a bottom wall, said side wall having a lower edge, said bottom wall having a portion declining from a point within the housing located on a level above the said lower edge of said side wall to a point spaced below and located laterally outwardly of said side wall and the lower edge of the side wall, the space between the lower edge of the side wall above the said portion of the bottom wall serving as a dispensing slot, said bottom wall including a horizontal portion extending laterally outwardly beyond the lower edge of the side wall and serving as a trough bottom, and an upstanding flange on the laterally outward edge of said horizontal portion.

2. In a poultry feeder, a housing having a side wall and a bottom wall, said side wall having a lower edge, said bottom wall having a portion declining from a point within the housing located on a level above the said lower edge of said side wall to a point spaced below and located laterally outwardly of said side wall and the lower edge of the side wall, the space between the lower edge of the side wall above the said portion of the bottom wall serving as a dispensing slot, said bottom including a horizontal portion extending laterally outwardly beyond the lower edge of the side wall and serving as a trough bottom, and an upstanding flange on the laterally outward edge of said horizontal portion, a plain longitudinal plate slidably engaging the laterally outward side of said housing side wall at a point above said dispensing slot, said side wall being provided with vertical slots, and clampable bolts extending through said plate and through said slots and releasably securing said plate in a selected position of vertical adjustment relative to said side wall in which a portion of said plate extends across said dispensing slot so as to decrease the width of the slot.

References Cited in the file of this patent

UNITED STATES PATENTS

| Number | Name | Date |
|---|---|---|
| 1,386,225 | Barland | Aug. 2, 1921 |
| 2,213,416 | Slawson | Sept. 3, 1940 |
| 2,216,511 | Copeman | Oct. 1, 1940 |
| 2,457,432 | Ballard | Dec. 28, 1948 |
| 2,518,085 | Smith | Aug. 8, 1950 |